United States Patent Office 3,468,826
Patented Sept. 23, 1969

3,468,826
PROCESS FOR THE PREPARATION OF HOMO-
GENEOUS ACRYLATE MODIFIED ALKYD
RESINS
Charles J. McWhorter, Glen Ellyn, and Edgar L. Clark,
Chicago, Ill., assignors to Commercial Solvents Cor-
poration, New York, N.Y., a corporation of Maryland
No Drawing. Filed May 3, 1967, Ser. No. 637,046
Int. Cl. C08g 39/10, 17/16
U.S. Cl. 260—22                                    19 Claims

ABSTRACT OF THE DISCLOSURE

A process for preparing a homogeneous acrylate modi-
fied alkyd resin by reacting: (1) a polymerization prod-
uct selected from the group consisting of a homopolymer
of an acrylic acid alkyl ester and a copolymer of an
acrylic acid alkyl ester and a vinyl monomer copolymer-
izable therewith, said copolymer containing at least 10%
by weight of acrylic acid alkyl ester, (2) a polyol, (3) a
member selected from the group consisting of a fatty
acid oil and a fatty acid, and (4) a member selected
from the group consisting of a polyfunctional carboxylic
acid and an anhydride of a polyfunctional carboxylic
acid, the said reaction being carried out in the presence
of an alcoholysis catalyst and under alkyd resin forming
conditions.

BRIEF SUMMARY OF THE INVENTION

This invention relates to a process for preparing alkyd
resins. In a particular aspect this invention relates to a
process for preparing homogeneous alkyd resins modified
by a polymeric product of an acrylic acid alkyl ester
by forming an alkyd resin in the presence of a polymeriza-
tion product of an acrylic acid alkyl ester and an alco-
holysis catalyst.

Alkyd resins are prepared by the reaction of a polyol,
a polyfunctional carboxylic acid or anhydride and a fatty
acid or fatty acid oil. The preparation, uses and properties
of alkyd resins are well known and are described in
numerous texts, such as "Organic Coating Technology,"
volume I, H. F. Payne, John Wiley and Sons, New York,
1954. A particularly desired class of alkyd resins are al-
kyd resins modified with polymers of acrylic acid alkyl
esters and copolymers of said esters with other copolym-
erizable vinyl compounds such as styrene, vinyl toluene,
α-methyl styrene and the like. This class of resins, com-
monly referred to as "acrylate modified" alkyd resins, has
been found to be especially useful in protective and dec-
orative finishes.

Acrylate modified alkyd resins have been prepared by a
variety of procedures. One widely employed procedure
involves polymerizing an acrylic acid alkyl ester or a
mixture of an acrylic acid alkyl ester and a vinyl mon-
omer copolymerizable therewith with a preformed alkyd
resin. Another procedure involves forming a polymeriza-
tion product of an acrylic acid alkyl ester and an un-
saturated, conjugated fatty acid or fatty acid oil and then
reacting the thus formed polymerization product with a
polyol and a polyfunctional carboxylic acid to obtain
the acrylate modified alkyd resin.

Heretofore in order to obtain a homogeneous acrylate
modified alkyd resin which when deposited on a surface
dries to a clear film, it has been necessary to employ an
unsaturated, conjugated fatty acid oil or fatty acid, as
typified by dehydrated castor oil and the fatty acid of
dehydrated castor oil. The necessity to use the relatively
expensive "conjugated" oils and acids instead of the rela-
tively inexpensive and more readily available saturated
and unsaturated, nonconjugated oils and acids in the pro-
duction of acrylate modified alkyd resins has been an im-
portant economic disadvantage.

It is an object of the present invention to provide a
process for preparing homogeneous acrylate modified al-
kyd resins.

It is a further object of the present invention to pro-
vide a process for preparing homogeneous acrylate modi-
fied alkyd resins employing saturated and unsaturated,
nonconjugated fatty acid oils and fatty acids.

Other objects and advantages of the present invention
will be apparent from the specification and appended
claims.

It has been discovered in accordance with the present
invention that homogeneous acrylate modified alkyd resins
are obtained using saturated or unsaturated, noncon-
jugated fatty acid oils and fatty acids by reacting a polyol,
a polyfunctional acid or anhydride, a fatty acid oil or
fatty acid and a polymerization product of acrylic acid
alkyl ester under alkyd resin forming conditions in the
presence of an alcoholysis catalyst.

DETAILED DESCRIPTION

In carrying out the process of the present invention
there is first provided an acrylic acid ester polymeriza-
tion product. The polymerization product may be a homo-
polymer of an acrylic acid alkyl ester or copolymer of
said ester with a vinyl monomer copolymerizable there-
with. The polymerization product may be prepared by
any suitable procedure. As for example, the polymeriza-
tion product may be prepared by dissolving the mon-
omeric acrylic acid alkyl ester or mixture of said ester
with vinyl monomer in a suitable solvent such as, for ex-
ample xylol or toluol, together with a polymerization cat-
alyst and heating the resulting material to polymerization
temperatures, as for example, temperatures in the range
of from about 100 to about 150° C. Suitable polymeriza-
tion catalysts include benzoyl peroxide, p-tertiary butyl
peroxide, dicumyl peroxide, mixtures of the foregoing
and the like. As a general rule, such catalysts are em-
ployed in an amount equivalent to from about 0.1 to
about 2.0% by weight based on the weight of the total
monomeric material. The polymerization is conveniently
and preferably conducted in the presence of the alkyd
resin forming materials, that is, the polyol, the polyfunc-
tional carboxylic acid or anhydride and the fatty acid oil
or fatty acid. If desired, however, the polymerization
product may be separately prepared and added to the al-
kyd resin forming components. However, if the polym-
erization is conducted in the presence of the alkyd resin
forming materials, it is essential, in order to obtain a
homogeneous product, that an alcoholysis catalyst be
present before increasing the temperature to react the
alkyd resin making compound. The alcoholysis catalyst
may be present during polymerization as a convenience.

The acrylic acid alkyl esters employed in the process
of the present invention are well known to the art. Ex-
amples of such esters are methyl acrylate, methyl meth-
acrylate, ethyl acrylate, methyl ethacrylate, butyl acrylate
and the like. Because of its ready availability and the excel-
lent results obtained therewith, methyl methacrylate is
preferred for use in the present invention.

As previously stated, the polymerization product of
acrylic acid alkyl ester used in the process of the present
invention may be a copolymer of acrylic acid alkyl ester
with a vinyl monomer copolymerizable therewith. Such
vinyl monomers are well known to the art and include
styrene, α-methyl styrene, vinyl toluene, mixtures thereof
and the like. While ratios of acrylic acid alkyl ester to
other vinyl monomer in the copolymer will be principally
governed by the properties which will be desired in the
alkyd resin, it is essential that the copolymer contain on a weight basis not less than about 10% and preferably not less than about 40% acrylic acid alkyl ester.

After preparation the acrylic acid alkyl ester polymerization product is heated under alkyd resin forming conditions in the presence of a polyol, a polyfunctional carboxylic acid or anhydride, a fatty acid or fatty acid oil and an alcoholysis catalyst to form the acrylate modified alkyd resin.

The alkyd resin formation step of the present invention may be carried out in any of the conventional ways. Thus, the resin may be prepared by a one-step procedure which comprises heating the alkyd resin forming materials and acrylic acid alkyl ester polymerization product simultaneously in the presence of an alcoholysis catalyst under esterification conditions, for example at a temperature generally in the range of from about 225 to about 300° C. The resin may also be prepared by a two-step procedure which comprises first heating the polyol, the fatty acid oil or acid and the acrylic acid alkyl ester polymerization product in the presence of an alcoholysis catalyst under alcoholysis conditions, for example at a temperature in the range of from 225 to about 300° C., to effect the formation of monoglycerides, adding a polyfunctional carboxylic acid or anhydride after completion of alcoholysis and further heating the resulting mixture under esterification conditions at a temperature in the range of from about 225 to about 300° C. to form the modified resin. As is well known to the art, in order to obtain a resin which on deposition forms a clear film, it is necessary when a fatty acid oil is used to employ the two-step procedure. When a fatty acid is used, the one-step procedure is preferred for convenience. However, if desired, the two-step procedure may also be employed. If desired, the alkyd resin forming step may be carried out in the presence of a suitable solvent. Such solvents include xylol, toluol, butanol, aliphatic and aromatic hydrocarbons.

An essential feature of the present invention is the use of an alcoholysis catalyst. Any suitable alcoholysis catalyst may be employed. Examples of such catalysts include litharge, calcium hydroxide, lead 2-ethylhexoate, calcium 2-ethylhexoate, lithium 2-ethylhexoate, lead naphthanate, calcium naphthanate, mixtures thereof and the like. Generally, the amount of catalyst employed is in the range of from about 0.05 to about 2.0% by weight of the metal content of the catalyst based on the weight of the polyol. While amounts greater than 2.0% may be employed, such amounts serve no useful purpose. Amounts of from about 0.1 to about 0.5% are preferred.

In the practice of the present invention any polyol suitable for use in the formation of alkyd resins may be employed. Among the polyols which may be used are pentaerythritol, ethylene glycol, sorbitol, glycerol, mixtures of the foregoing and the like. Generally, polyols having three or more hydroxyl groups are preferred with pentaerythritol being particularly preferred.

Although it is a particular advantage of the present invention to employ saturated and unsaturated, nonconjugated fatty acids and fatty acid oils, any suitable fatty acid oil or fatty acid including unsaturated, conjugated fatty acids and fatty acid oils may be used. Exemplary of such fatty acid oils are coconut oil, palm kernel oil, safflower oil, rape seed oil, mustard seed oil, olive oil, peanut oil, corn oil, soybean oil, sunflower oil, raw castor oil, dehydrated castor oil, tung oil, mixtures of the foregoing and the like. Because of its ready availability and the excellent results obtained therewith, safflower oil is particularly preferred. Among the fatty acids which may be used in the present invention are lauric, myristic, palmitic, oleic, stearic, linoleic, pelargonic, behenic, linolinic, caproic acids, mixtures of the foregoing and the like. Fatty acids having from about 6 to about 24 carbon atoms are generally preferred.

Any suitable polyfunctional carboxylic acid or anhydride may be employed in the present invention. Examples of such polyfunctional carboxylic acids and anhydrides include phthalic acid, phthalic anhydride, isophthalic acid, succinic anhydride, adipic acid, sebacic acid, mixtures of the foreoing and the like.

The components of the acrylate modified alkyd resins, namely, the acrylic acid alkyl ester polymerization product, the polyol, the polyfunctional acid or anhydride and the fatty acid or fatty acid oil may be used in widely varying proportions, depending upon the properties desired and the reactants employed. To those skilled in the art it will be obvious that the process of the present invention can be used to prepare resins having a wide variety of properties.

The invention will be understood more fully by reference to the following examples. It is understood that the examples are presented for purposes of illustration only and are not intended as a limitation of the invention.

Example 1

This example describes the preparation of an acrylate modified alkyd resin by the process of the present invention using an unsaturated, nonconjungated fatty acid oil. The two-step alkyd resin forming procedure is employed. In the example all parts are by weight.

A three-necked reaction vessel equipped with thermometer, stirrer, reflux condenser and inert gas inlet tube was flushed with a mixture of carbon dioxide and nitrogen. Into the vessel were then charged 1,747 parts safflower oil, 344 parts pentaerythritol and 3 parts lead 2-ethylhexoate (as a 24% solution). The resulting mixture was blanketed with a mixture of carbon dioxide and nitrogen. The mixture was then heated with stirring to about 140° C. and maintained at that temperature while a mixture containing 1,185 parts monomeric methyl methacrylate, 1,101 parts monomeric styrene, 47.5 parts benzoyl peroxide and 6.75 parts p-tertiary butyl peroxide was added. After the addition was completed, heating was continued at about 140° C. for approximately two hours with continuous stirring. The temperature of the mixture was then raised over a three-hour period to about 250° C. and maintained at that temperature for about two hours to sufficiently complete the alcoholysis. Alcoholysis is sufficiently complete when one part of the heated material is soluble in four parts of a 50–50 mixture of xylene and methanol. After completion of alcoholysis the resulting material was cooled to about 200° C. and 567 parts of isophthalic acid were added thereto. The entire mixture was then heated to about 255° C. and maintained at that temperature for about 2½ hours during which time a steady stream of a mixture of carbon dioxide and nitrogen was passed through the reaction vessel to remove water and to provide a blanket of inert gas for the resulting acrylate modified alkyd resin. The clear, homogeneous acrylate modified alkyd resin had an acid number of 8. When diluted with xylene to 50% nonvolatile solids, the resin had a viscosity of V on the Gardner-Holdt scale.

Films prepared from the resin dry rapidly to a hard finish with a high gloss.

Example 2

An acrylate modified alkyd resin may be prepared following the general procedure of Example 1 and substituting soybean oil for safflower oil and methyl acrylate for the mixture of methyl methacrylate and styrene. A clear, homogeneous acrylate modified alkyd resin is obtained.

Example 3

This example describes the preparation of an acrylate modified alkyd resin by the process of the present invention using a saturated fatty acid. The one-step alkyd resin forming procedure is employed. In the example all parts are by weight.

A reaction vessel of the type described in Example 1 was flushed with a mixture of carbon dioxide and nitrogen. Into the vessel were charged 284 parts pelargonic acid, 166 parts isophthalic acid, 136 parts pentaerythritol, and 1 part lead 2-ethylhexoate (as a 24% solution). The resulting mixture was blanketed with a mixture of carbon dioxide and nitrogen. The mixture was then heated with stirring to about 145° C. and maintained at that temperature while a mixture containing 300 parts monomeric methyl methacrylate, 280 parts monomeric styrene, 22 parts benzoyl peroxide and 2.0 parts p-tertiary butyl peroxide was added. After the addition was completed, heating was continued at about 145° C. for approximately two hours. The temperature of the mixture was then slowly raised over a three-hour period to about 255° C. and maintained at that temperature for about three additional hours. A clear, homogeneous acrylate modified alkyd resin having an acid number of 2 was obtained.

Example 4

An acrylate modified alkyd resin may be prepared following the general procedure of Example 3 and substituting linoleic acid for pelargonic acid, phthalic anhydride for isophthalic acid, glycerol for pentaerythritol, ethyl acrylate for the mixture of methyl methacrylate and styrene and litharge for lead 2-ethylhexoate. A clear, homogeneous acrylate modified alkyd resin is obtained.

Example 5

This example describes the preparation of an acrylate modified alkyd resin by the process of the present invention using an unsaturated, nonconjugated fatty acid oil. The two-step alkyd resin forming procedure is employed. In the example all parts are by weight.

A reaction vessel of the type described in Example 1 was flushed with a mixture of carbon dioxide and nitrogen. Into the vessel were then charged 1032 parts safflower oil, 203 parts pentaerythritol, and 1.7 parts lead 2-ethylhexoate (as a 24% solution). The resulting mixture was blanketed with a mixture of carbon dioxide and nitrogen. The mixture was then heated with stirring to about 140° C. and maintained at about that temperature for 2½ hours while a mixture containing 170 parts ethyl acrylate, 1530 parts vinyl toluene, 28 parts benzoyl peroxide and 4.0 parts p-tertiary butyl peroxide was slowly added thereto. After the addition was completed the temperature of the mixture was slowly raised over a one-hour period to about 257° C. and maintained at that temperature for about two hours to sufficiently complete the alcoholysis. After completion of alcoholysis the resulting material was cooled to about 160° C. and 335 parts of isophthalic acid were added thereo. The entire mixture was then heated to about 245° C. and maintained at about that temperature for about 5½ hours during which time a steady stream of a mixture of carbon dioxide and nitrogen was passed through the reaction vessel to remove water and to provide a blanket of inert gas for the resulting acrylate modified alkyd resin. The clear, homogeneous acrylate modified alkyd resin had an acid number of 6. When diluted with varnish maker's and painter's naphtha to 61% nonvolatile solids, the resin had a viscosity of $Z_4$ on the Gardner-Holdt scale.

Films prepared from the resin dry rapidly to a hard finish with a high gloss.

Since many embodiments of this invention may be made and since many changes may be made in the embodiments described, the foregoing is to be interpreted as illustrative only and the invention is defined by the claims appended hereto.

We claim:
1. A process for preparing a homogeneous acrylate modified alkyd resin which comprises reacting under alkyd resin forming conditions in the presence of an alcoholysis catalyst selected from the group consisting of litharge, calcium hydroxide, lead 2-ethylhexoate, calcium 2-ethylhexoate, lithium 2-ethylhexoate, lead naphthanate, calcium naphthanate and their mixtures:
 (1) a polymerization product selected from the group consisting of a homopolymer of an acrylic acid alkyl ester and a copolymer of an acrylic acid alkyl ester and a vinyl monomer copolymerizable therein, said copolymer containing at least 10% by weight of acrylic acid alkyl ester,
 (2) a polyol,
 (3) a member selected from the group consisting of a fatty acid oil and a fatty acid, and
 (4) a member selected from the group consisting of a polyfunctional carboxylic acid and an anhydride of a polyfunctional carboxylic acid.

2. A process for preparing a homogeneous acrylate modified alkyd resin which comprises providing a reaction mixture comprising:
 (1) a polymerization product selected from the group consisting of a homopolymer of an acrylic acid alkyl ester and a copolymer of an acrylic acid alkyd ester and a vinyl monomer copolymerizable therewith, said copolymer containing at least 10% by weight of acrylic acid alkyl ester,
 (2) a polyol,
 (3) a fatty acid, and
 (4) a member selected from the group consisting of a polyfunctional carboxylic acid and an anhydride of a polyfunctional carboxylic acid, heating said reacting mixture in the presence of an alcoholysis catalyst selected from the group consisting of litharge, calcium hydroxide, lead 2-ethylhexoate, calcium 2-ethylhexoate, lithium 2-ethylhexoate, lead naphthanate, calcium naphthanate and their mixtures under esterification conditions to form a homogeneous acrylate modified alkyd resin.

3. The process of claim 2 in which the temperature of heating is in the range of from about 225 to about 300° C.

4. The process of claim 2 wherein the vinyl monomer is styrene.

5. The process of claim 2 wherein the acrylic acid alkyl ester is methyl methacrylate.

6. The process of claim 2 wherein the polyol is pentaerythritol.

7. The process of claim 2 wherein the polyfunctional carboxylic acid is isophthalic acid.

8. The process of claim 2 wherein the fatty acid is a fatty acid selected from the group consisting of saturated fatty acids and unsaturated, nonconjugated fatty acids.

9. The process of claim 8 wherein the fatty acid contains from about 6 to about 24 carbon atoms.

10. The process of claim 2 wherein the alcoholysis catalyst is lead 2-ethylhexoate.

11. A process for preparing a homogeneous acrylate modified alkyd resin which comprises providing a reaction mixture comprising:
 (1) a polymerization product selected from the group consisting of a homopolymer of an acrylic acid alkyl ester and a copolymer of an acrylic acid alkyl ester and a vinyl monomer copolymerizable therewith, said copolymer containing at least 10% by weight of acrylic acid alkyl ester,
 (2) a polyol,
 (3) a fatty acid oil, and
 (4) an alcoholysis catalyst selected from the group consisting of litharge, calcium hydroxide, lead 2-ethylhexoate, calcium 2-ethylhexoate, lithium 2-ethylhexoate, lead naphthanate, calcium naphthanate and their mixtures, heating said mixture under alcoholysis conditions; adding to the said mixture a member selected from the group consisting of a polyfunctional carboxylic acid and an anhydride of a polyfunctional carboxylic acid; and further heating the resulting mixture under esterification conditions until a homogeneous acrylate modified alkyd resin is formed.

12. The process of claim 11 in which the temperature of heating is in the range of from about 225 to about 300° C.

13. The process of claim 11 wherein the acrylic acid alkyl ester is methyl methacrylate.

14. The process of claim 11 wherein the vinyl monomer is styrene.

15. The process of claim 11 wherein the polyol is pentaerythritol.

16. The process of claim 11 wherein the alcoholysis catalyst is lead 2-ethylhexoate.

17. The process of claim 11 wherein the polyfunctional carboxylic acid is isophthalic acid.

18. The process of claim 11 wherein the fatty acid oil is a fatty acid oil selected from the group consisting of saturated fatty acid oils and unsaturated, nonconjugated fatty acid oils.

19. The process of claim 18 wherein the fatty acid oil is safflower oil.

References Cited

UNITED STATES PATENTS

| | | | |
|---|---|---|---|
| 2,647,093 | 7/1953 | Opp et al. | 260—22 |
| 2,890,185 | 6/1959 | Sample et al. | 260—22 |
| 3,335,102 | 8/1967 | Bussell et al. | 260—22 |
| 3,349,050 | 10/1967 | Salem | 260—22 |
| 3,350,335 | 10/1967 | Silver | 260—22 |

DONALD E. CZAJA, Primary Examiner

R. W. GRIFFIN, Assistant Examiner

U.S. Cl. X.R.

117—161, 167; 260—23, 33.6, 863